United States Patent
Ducker

(10) Patent No.: US 11,218,318 B2
(45) Date of Patent: Jan. 4, 2022

(54) TWO-STEP DATA DELETION HAVING CONFIRMATION HOLD

(71) Applicant: EMC IP Holding Company, LLC, Hopkinton, MA (US)

(72) Inventor: Zachary Ian Ducker, Lillington, NC (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 314 days.

(21) Appl. No.: 16/386,167

(22) Filed: Apr. 16, 2019

(65) Prior Publication Data

US 2020/0336311 A1 Oct. 22, 2020

(51) Int. Cl.
| | |
|---|---|
| H04L 9/32 | (2006.01) |
| G06F 3/06 | (2006.01) |
| H04L 9/08 | (2006.01) |
| G06F 21/60 | (2013.01) |
| H04L 9/14 | (2006.01) |

(52) U.S. Cl.
CPC .......... *H04L 9/3228* (2013.01); *G06F 3/0608* (2013.01); *G06F 3/0623* (2013.01); *G06F 3/0637* (2013.01); *G06F 3/0652* (2013.01); *G06F 3/0673* (2013.01); *G06F 21/602* (2013.01); *H04L 9/0894* (2013.01); *H04L 9/14* (2013.01)

(58) Field of Classification Search
CPC .... G06F 3/0608; G06F 3/0623; G06F 3/0637; G06F 3/0652; G06F 3/0673; G06F 21/602; H04L 9/3228; H04L 9/0894; H04L 9/14

USPC .................. 713/193; 726/5, 22, 26
See application file for complete search history.

(56) References Cited

U.S. PATENT DOCUMENTS

| | | | |
|---|---|---|---|
| 8,302,169 B1* | 10/2012 | Presotto | H04L 63/102 726/5 |
| 2007/0240214 A1* | 10/2007 | Berry | H04L 63/1416 726/22 |
| 2008/0222734 A1* | 9/2008 | Redlich | H04L 63/02 726/26 |
| 2008/0280644 A1* | 11/2008 | Hugot | H04L 63/0853 455/556.2 |
| 2019/0130128 A1* | 5/2019 | Khassanov | H04L 9/0894 |
| 2019/0208003 A1* | 7/2019 | Lang | H04L 67/10 |
| 2020/0068010 A1* | 2/2020 | Xing | G06F 11/3476 |
| 2020/0082103 A1* | 3/2020 | Heidinga | G06F 12/0253 |

* cited by examiner

*Primary Examiner* — Prabodh M Dharia
(74) *Attorney, Agent, or Firm* — Barry N. Young

(57) ABSTRACT

A data management process in a storage system comprises a two-step deletion process with a confirmation hold. Data identified in a service request for deletion is encrypted using a one-time use public key to render the data inaccessible to users and system processes. The data is decrypted using a corresponding private key and verified that the data corresponds to the data and is quarantined to prevent access by changing permissions. The quarantined data is further analyzed using a set of criteria that to determine whether access to the data by system users or process is still needed. If not, the data is permanently deleted by securely deleting the encryption and decryption keys.

18 Claims, 4 Drawing Sheets

TWO-STEP DATA DELETION HAVING CONFIRMATION HOLD

BACKGROUND

This invention relates generally to data management in data storage systems such as databases and file systems, and more particularly to methods and systems that render data indicated for deletion inaccessible but does not actually purge the data from storage. If deletion of the data is confirmed based upon predetermined criteria, the data may be rendered permanently inaccessible or purged.

Data management in large enterprises and other such organizations is essential for data integrity and to reduce data loss. Data that is stored in databases or in file systems may become invalid or useless and is no longer needed. In enterprise storage, it is desirable to delete or purge the data the data from storage systems to free up storage space. Additionally, since data may be inadvertently deleted by mistake, it may also be desirable to retain, at least temporarily, data intended for deletion until permanent deletion of the data is confirmed to be correct, and to inhibit access to the data to prevent its inadvertent use by business processes. Consider, for instance, data that is referenced by other data or processes. If potentially useful data is inadvertently deleted without full confirmation that it is no longer needed, important records and files could become lost, at worst, or require burdensome retrieval from backup media, at best. Moreover, having to deal with lost data could result in missed revenue opportunities, increased costs and operational downtime. Therefore, before permanently deleting data, review and confirmation of the decision to delete the data should be undertaken to ensure that the deletion decision is correct and to avoid subsequent problems where it is later found that the deleted data is actually needed.

There is a need for systems and methods that allow an initial decision to be made that certain designated data can be deleted and prevent further access to that data by system resources without actually removing the data from the system until the initial deletion decision is confirmed so that the data can be restored if needed. It is desirable to provide systems and methods that address these and other similar needs by enabling selected data to be designated for deletion and preventing further access to the data, without actually removing the data from the system, and that place a hold on the initial deletion decision until it is confirmed, thereby enabling the initial decision to be overturned and the data access to be restored if necessary. It is to these ends that this invention is directed.

DESCRIPTION OF PREFERRED EMBODIMENTS

Figure 1:
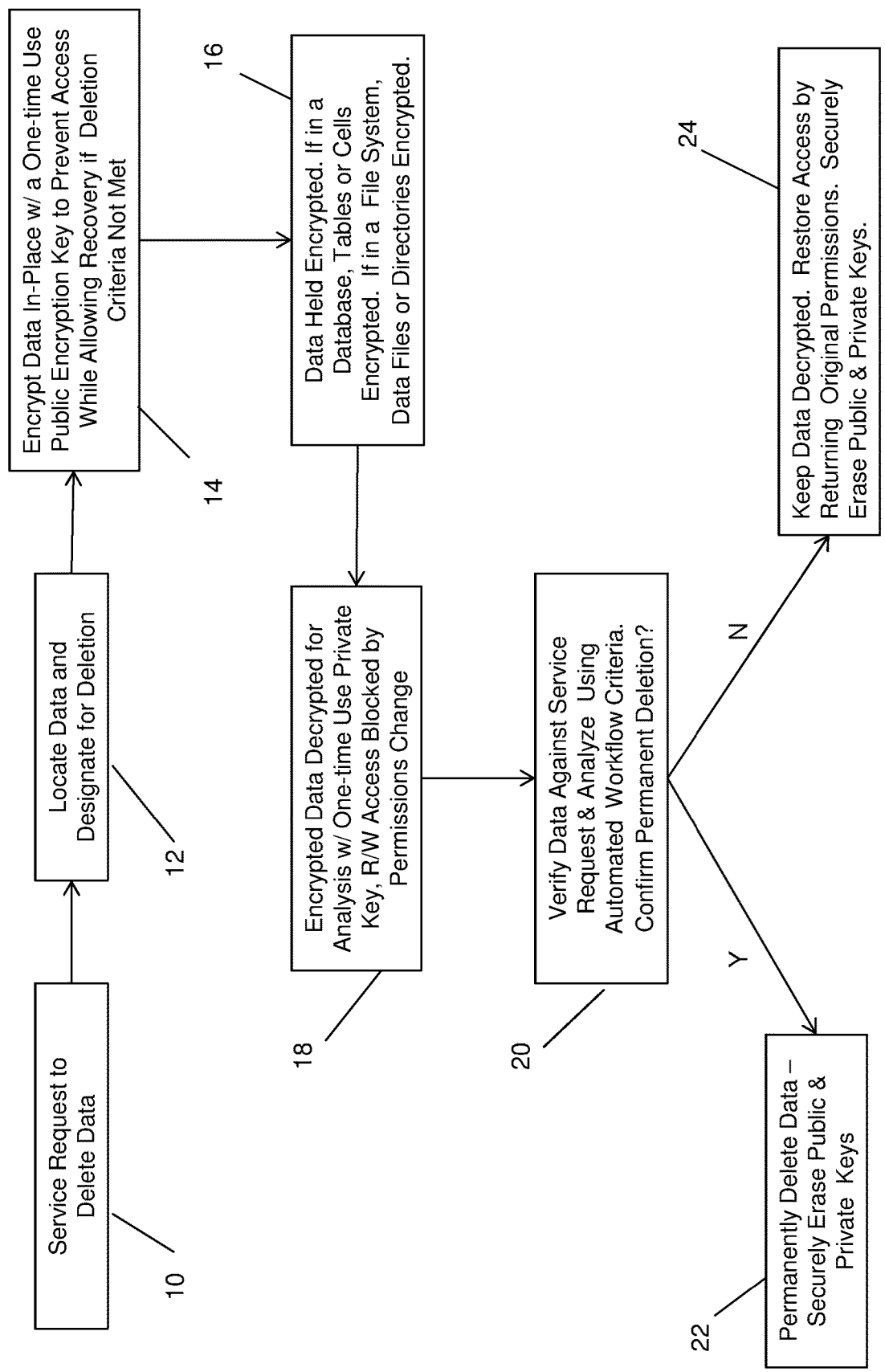
FIG. 1 is a functional block diagram giving an overview of a two-step data deletion method in accordance with an embodiment of the invention for managing data deletion in a data storage system with a confirmation hold on the data deletion.

The present invention is particularly useful for an enterprise storage system having database and/or file system data storage, and will be described in that context. As will become apparent, however, this is illustrative of only one utility of the invention, and the invention has greater utility and in different types of systems.

As will be described, the invention affords a two-step data deletion system and method that allow for a first immediate data scrub with a hold on permanent deletion for a second more thorough review to verify that the data is the data that was requested to be deleted and to confirm the that the data is no longer needed by other business units or processes. This allows the data to be decommissioned and access to it removed without having to wait in a service desk ticket queue until the initial deletion request can be acted on. The invention enables a data deletion request to be acted on immediately and automatically without the attendant delay that comes from traditional follow-on review by a service desk, and without having to be concerned about losing the data permanently. The two-step data deletion process in accordance with an embodiment of the invention immediately renders the data inaccessible upon an initial deletion request or decision (first step) as through encryption of the data, preferably using asymmetric cryptography (public key cryptography). In a first step (stage), in an embodiment the data would be encrypted by the public key which is available to a user or data custodian who is performing this first step in response to a deletion request. Encryption renders the data inaccessible, but does not actually delete the data. Rather, it restricts further access to the data, which enables a temporary hold on the actual deletion of the data. A second confirmation step (stage) is then performed, preferably automatically by a processing system that that has access to the corresponding private key to decrypt the encrypted data for verification and analysis according to predetermined criteria (rules) in a workflow to confirm the initial deletion decision and permanently delete the data.

This two-step process involves two distinct stages each of which has responsibility for ensuring that data is properly stored, processed, and managed. It allows a quick deletion (by encryption) which immediately removes access to the data by data processing applications and the database or file system that once held and served this data, and then puts a hold on the actual deletion of the data to allow for a review process to verify and confirm that the initial deletion request is correct. The hold maintains the data in quarantine in the interim (between steps one and two) during which access is prevented until the verification and confirmation stage is complete. During this hold, the data is inaccessible except to the verification and confirmation review process, or possibly to a senior level data steward who has access to the decryption key. Once deletion is confirmed, the data may then be permanently deleted—with or without actual removal from storage, as will be described. In the event that deletion is not confirmed, the data may be restored to its original unencrypted state.

FIG. 1 illustrates an overview of a two-step data deletion workflow in accordance with an embodiment of the invention for managing data deletion in a data storage system with a confirmation hold on the data deletion. The data storage system may be, in one embodiment, a database and, in another embodiment, a file system.

Referring to FIG. 1, at 10 a service request may be generated by and received from a data custodian or user of the data storage system or from an application processing system data to delete data. At 12, the particular data corresponding to the request may be located and selected, as by using metadata for file associations or database correlations, and designated for deletion. At 14, the data may be encrypted, preferably in-place, by the system as by using an asymmetric encryption process, such as with a one-time use public encryption key, for example. A SQL command may be used with a database, or a Linux shell script or a Windows PowerShell command may be used with a file system to accomplish in-place encryption. As an alternative to in-place encryption, the designated data may also be accessed, encrypted and moved to another location, and the original plaintext data may be deleted from its original location as by overwriting it with 1's and 0's. Encryption advantageously immediately prevents access to the data without actually deleting it, but allows restoration of the data if permanent predetermined deletion criteria (to be described below) are not met upon subsequent review and determination that the original deletion was improper.

At 16 the data is held encrypted so that access to the data by applications and other processes is prevented. If the data is in a database, encryption may be accomplished by encrypting the relevant tables or cells. If the data is in a file system, the data files or directories may be encrypted. The foregoing steps comprise the first stage (deletion) of a two-step deletion with hold confirmation process in accordance with the invention.

The second stage (confirmation) of the two-step deletion process, which starts at 18 in FIG. 1, verifies that the data was corrected selected based upon the service request and analyzes the data with respect to a set of predetermined permanent deletion criteria (rules), such as described below, to confirm that permanent deletion is proper. This confirmation stage comprises a workflow process that is preferably performed automatically by a processor having a physical memory embodying executable instructions for controlling the processor to perform confirmation process steps such as described herein. As a backup or an alternative, the second confirmation workflow may be performed by a data steward that instantiates analysis of the data in accordance with the predetermined criteria. The data encrypted at 18 may be decrypted to permit verification and analysis by this confirmation process, as by using a one-time private key corresponding to the public key used to encrypt the data. While decrypted for verification and analysis, read/write access to the decrypted data by the storage system storing the data and other application processes may be blocked, as by changing access permissions.

At 20, the decrypted data may be verified and analyzed by comparing it to the initial service request to verify that the selected data is, in fact, the data that was the subject of the service request; the data also may be analyzed with respect to the predetermined permanent deletion workflow criteria to confirm that the data is no longer needed by other users and system processes and that permanent deletion of the data will not adversely impact further system operations and is proper. If at 20 the selected data is verified and comparison of the data to the predetermined deletion criteria confirms that the permanent deletion is proper, at 22 the data may be permanently deleted, as by securely erasing the public and private keys used for encryption and decryption. The data need not necessarily be physically removed from storage for permanent deletion. Rather the data may be held in a quarantined, inaccessible state. Alternatively, the data may be actually removed, if desired, by overwriting it. On the other hand, if at 20 the predetermined criteria does not confirm that the data should be deleted, at 24 the data may be returned to its original unencrypted state, and access to it restored as by returning the original access permissions. The one-time use public and private keys are then preferably securely erased.

Figure 2:
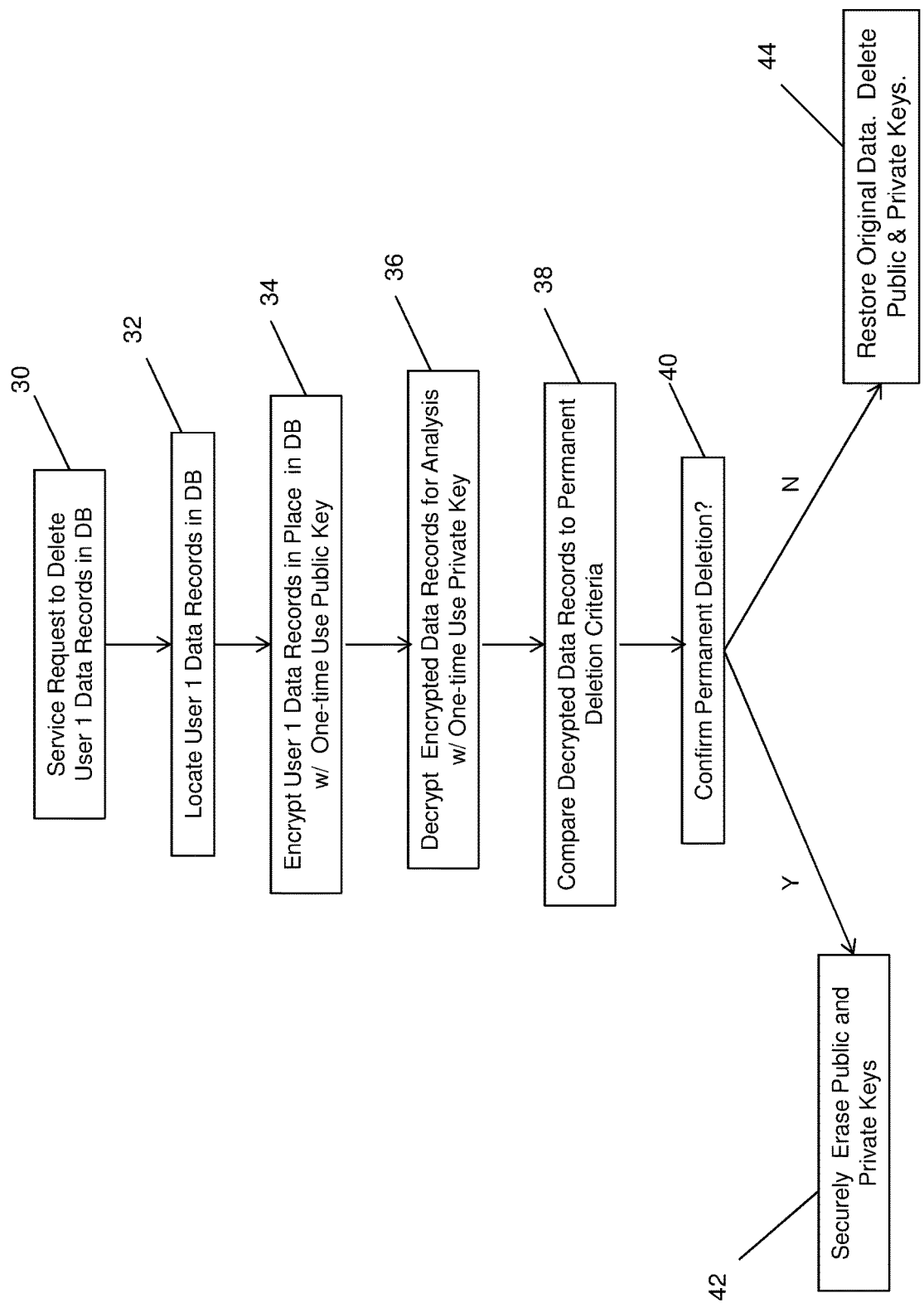
FIG. 2 is a workflow diagram of a process in accordance with an embodiment of the invention showing an application of the two-step process of FIG. 1 to a database storage system.

FIG. 2 illustrates an embodiment of the two-step workflow process of FIG. 1 as applied to a database storage system. Referring to FIG. 2, at 30 a service request to delete the data of a user (User 1) may be received or otherwise generated. At 32 User 1's data records may be located in the database, as from metadata, and designated for deletion. At 34 the data records may be encrypted in-place in the database using, for instance, a one-time use public key, as previously described. These foregoing steps correspond to the first stage of a two-step data deletion process in accordance with the invention.

The confirmation stage of the two-step process begins at 36 by decrypting the encrypted data records for verification and further analysis using the one-time use private key corresponding to the one-time use public key. At this time, read/write access to the user data may be blocked by a permissions change. At 38, the decrypted data records are verified to be correctly selected, and they are compared to the predetermined deletion criteria to confirm that permanent deletion is proper. If permanent deletion is proper, at 42 the public and private keys may be securely and permanently erased, as by overwriting the keys multiple times with random strings of 1's and 0's, which effectively deletes the keys and leaves the encrypted data inaccessible. If desired, the data may be permanently removed by also overwriting it, as previously described.

Figure 3:
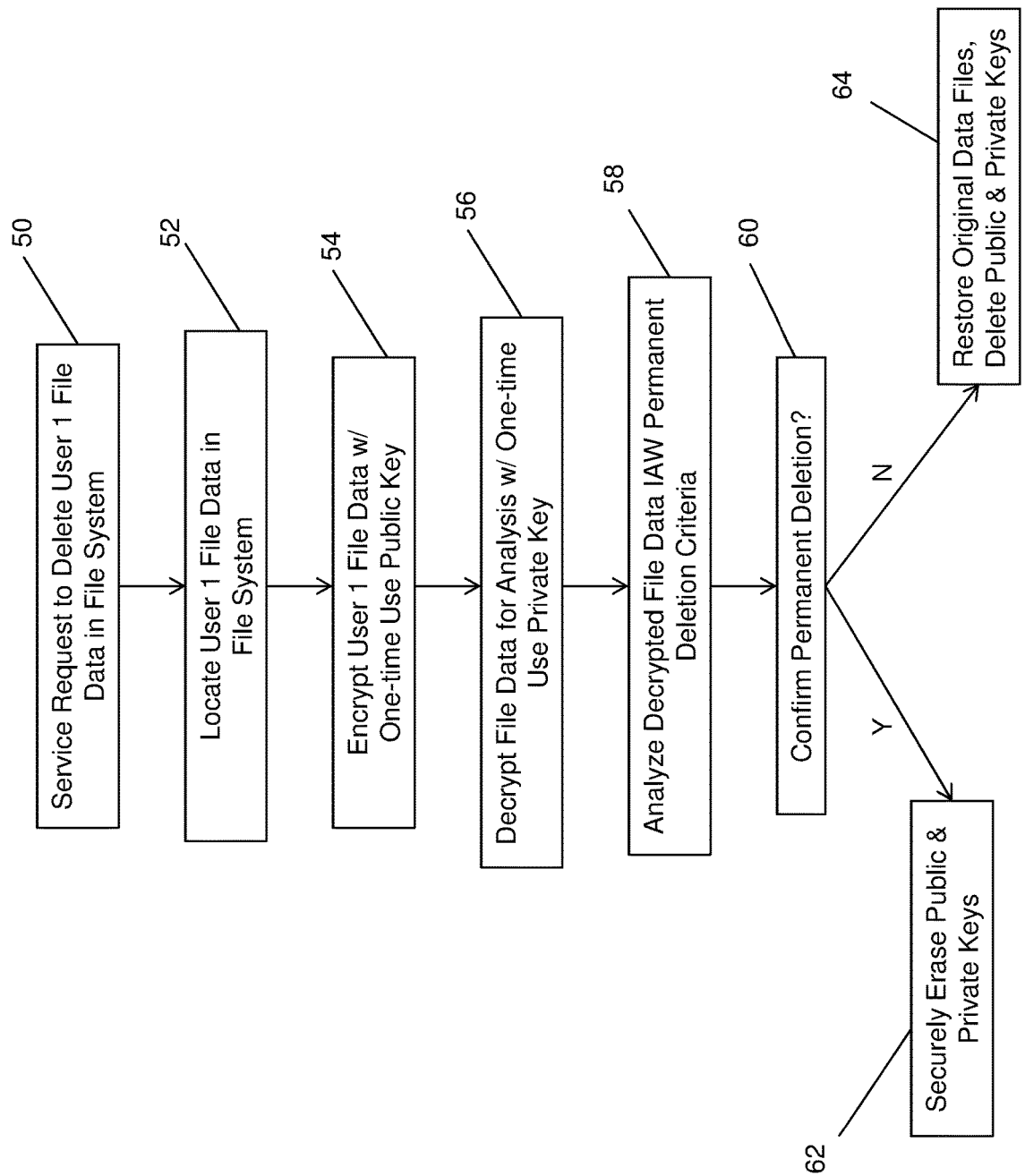
FIG. 3 is a workflow diagram of a process in accordance with an embodiment of the invention showing of the two-step process of FIG. 1 applied to a file system data storage system.

FIG. 3 is a workflow process similar to FIG. 2 as applied to a file system. At 50 a request to delete User 1 file data in the file system may be received or otherwise generated. At 52, the file data may be located in the file system and selected; and at 54 the file data may be encrypted in-place in the file system using a one-time use public key. At 56, the encrypted file data may be decrypted using the one-time private key corresponding to the public key for verification and analysis of the selected file data, and read/write access to the file data blocked by a permissions change. At 58 the decrypted file data may be verified and compared to the predetermined permanent file deletion criteria; and at 60 permanent deletion of the file data may be confirmed. At 62 if permanent deletion is confirmed, the public and private keys may be securely erased to prevent future access to the file data, and the file data may be actually removed or not from the file system, as previously described. If, however, permanent deletion is not confirmed, at 64 the original unencrypted data may be restored in place, and the public and private keys securely erased as by over writing them multiple times with a random string of bits.

As may be appreciated, different sets of confirmation criteria (rules) may be used depending upon the circumstances to confirm whether the selected data may be permanently deleted from the storage system. As previously described, permanent deletion should not be done if there is any possibility of a future need for the data, as by the data owner, associations with other data, other users in the enterprise, or other processes. Furthermore, as may also be appreciated, there may be situations where it may be desirable to postpone a decision as to permanent deletion of the data based upon the possibility of certain occurrences.

Different criteria may be necessary for these different circumstances. Initial encryption of the data, as described above, effectively and immediately quarantines the data by removing further access to the data by other users or processes, while advantageously permitting the data to be analyzed and promptly restored if it is determined that the initial deletion was improper.

Figure 4:
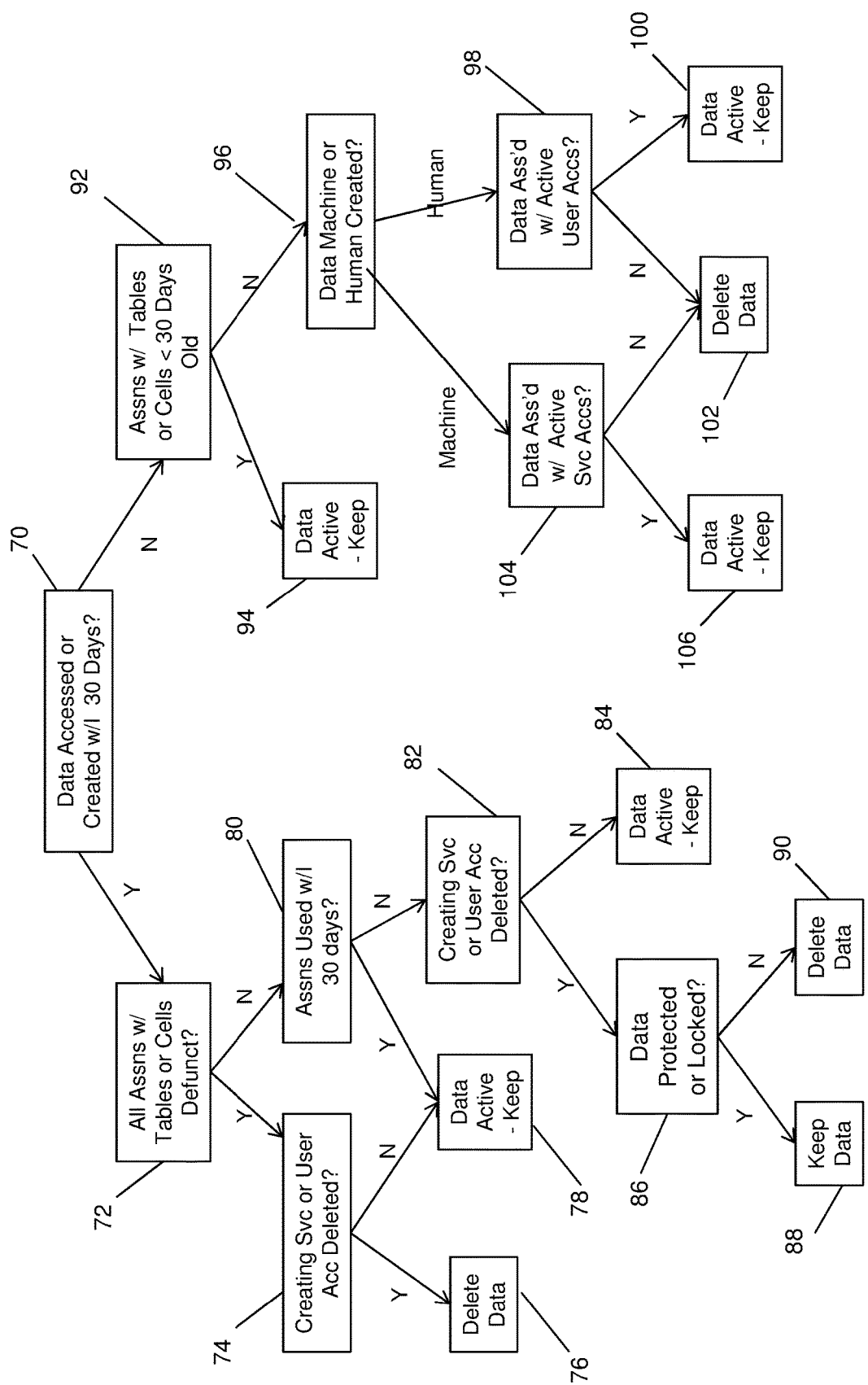
FIG. 4 is a workflow diagram illustrating in more detail an embodiment of criteria and a workflow for the two-step deletion process with confirmation hold of FIG. 3 applied to a database, the criteria shown being for data having an exemplary useful life of 30 days.

FIG. 4 illustrates an embodiment in accordance the invention of a stage two analysis and confirmation workflow process in a database comprising different exemplary criteria that may be employed for confirming permanent deletion of data initially selected in stage one of the two-step deletion process of the invention. A will be appreciated, the criteria illustrated and described below are merely illustrative, other criteria may be used effectively as well.

Referring to FIG. 4, as shown the confirmation process may comprise hierarchical sets of conditional criteria (rules) to confirm whether the data may be safely permanently deleted. As a first question (criterion) 70 of the confirmation process, it may be initially determined whether the subject data has either been created or accessed within a preceding predetermined period of time, such as, for example, 30 days. Depending upon the answer to this first determination, the analysis may proceed along different paths. If it is determined that the subject data has either been accessed or created within this time period, the process may progress along the left-hand (in the figure) "Y" path to 72. At criterion 72, it may be determined whether all associations with the data tables or cells to the data are defunct. If yes (Y), the process moves to 74 where it is determined whether either the creating service or the user account that created the data has been deleted. If yes, at 76 the data may be deleted since the originator no longer exists. Otherwise, if not, at 78 it is determined that the data is still active and should be kept, and the process ends.

Returning to 72, if all associations with the data tables or cells are not defunct (path N), the process moves to criterion 80 where it is determined whether any of the data associations have been used within the last predetermined time period of 30 days. If yes (Y), the process moves to 78 where it is determined that the data is still active and should be kept, and the process ends. Otherwise, from 80 the process moves to 82 where it is determined whether the creating service or user account that created the data has been deleted. If not, it is determined at 84 that the data is still active and should be kept, and the process ends. Otherwise, the process moves from 82 to 86 where it is determined whether the data is protected or locked. If the data is locked or protected, at 88 it is determined that the data is still active and should be kept, and the process ends. If at 86 the data is not locked or protected, at 90 it is determined that the data may be deleted, and the process ends.

Returning to the initial process step 70, if the data was not accessed or created within the preceding 30 days, the process moves along the right-hand path (N) (in the figure) to 92 where it is next determined whether any associations with the data tables or cells are less than the preceding predetermined time period (e.g., 30 days). If they are (Y), at 94 the data is considered to be still active, is kept, and the process ends. If the associations are not less than 30 days old (N), at 96 it is determined whether the data was machined created or human created. Machine created data comprises data created and maintained by the system such as, for example, system logs, metadata, login logs, user visit logs, etc., to name a few. If the data was human created, at 98 it is determined whether the data is associated with any active user accounts. If yes, at 100 the data is considered to be active and is kept and the process ends. If not (N), at 102 the data is deleted and the process ends. On the other hand, if at 96 it is determined that the data is machine created, at 104 it is determined whether the data is associated with an active service account. If not (N) the data is deleted at 102. Otherwise, at 106 it is determined that the data is still active and it is kept. The process then ends.

From the foregoing, it can be seen that the criteria of the confirmation process of FIG. 4 seeks to determine the existence of circumstances where the selected data may be needed in the future. As in the embodiment shown, the process may have a hierarchical conditional workflow structure where criteria are linked in an order of importance as "if-then" types of conditional rules, starting with how long it has been since the data was created or accessed by a user or a process. Depending upon the answer that question, different criteria may be applied to reach a determination as to permanent deletion. The failure to satisfy one particular criterion or a set of linked criteria can be is sufficient to reach a decision as to whether the data may be needed in the future, and to confirm whether or not to permanently delete the selected data and end the confirmation process. It will be appreciated that other criteria and rules and different conditional relationships may also be used for the confirmation process.

While the foregoing has been with reference to particular embodiments of the invention, it will be appreciated that changes to these embodiments may be made with departing from the principles of the invention, the scope of which is defined by the appended claims.

The invention claimed is:

1. A computer implemented method of managing data in a storage system to remove unneeded data, comprising:
   encrypting identified user data in-place in an original location of said identified user data in said storage system in response to a deletion request identifying said user data for deletion, said encrypting comprising encrypting immediately said identified user data using a one-time use encryption key, and said encrypting preventing further access to said user data;
   decrypting temporarily the encrypted identified user data using a decryption key corresponding to said encryption key, and blocking access to the temporarily decrypted user data by changing access permissions;
   verifying that the temporarily decrypted user data corresponds to the user data that was identified in said deletion request;
   analyzing said temporarily decrypted user data using a confirmation process to determine whether permanent deletion of said user data should be confirmed; and
   upon confirming said deletion, permanently deleting said user data.

2. The computer implemented method of claim 1, wherein upon confirming said deletion, securely deleting said encryption and decryption keys.

3. The computer implemented method of claim 1, wherein upon not confirming said deletion, maintaining said user data decrypted and restoring said access permissions.

4. The computer implemented method of claim 3 further comprising upon restoring said access permissions, deleting said encryption and decryption keys.

5. The computer implemented method of claim 1, wherein said confirmation process comprises a hierarchical set of criteria that determines whether the user data is needed by system users or system processes.

6. The computer implemented method of claim 1, wherein said confirmation process comprises a criterion that determines whether the data was accessed or created within a preceding predetermined period of time.

7. The computer implemented method of claim 6, wherein said confirmation process further comprises a criterion that determines whether a service or user account that created the data has been deleted.

8. The computer implemented method of claim 6, wherein said confirmation process further comprises a criterion that determines whether the user data was machine created or human created.

9. The computer implemented method of claim 8, wherein said confirmation process further determines whether the user data is associated with either an active service account or an active user account, and, if so, keeps the user data.

10. Non-transitory computer readable media embodying executable instructions for controlling the operation of a processor to perform a method of managing data in a storage system to remove unneeded data, comprising:
   encrypting identified user data in-place in an original location of said identified user data in said storage system in response to a deletion request identifying said user data for deletion, said encrypting comprising encrypting immediately said identified user data using a one-time use encryption key, and said encrypting preventing further access to said user data;
   decrypting temporarily the encrypted identified user data using a decryption key corresponding to said encryption key, and blocking access to the temporarily decrypted user data by changing access permissions;
   verifying that the temporarily decrypted user data corresponds to the user data that was identified in said deletion request;
   analyzing said temporarily decrypted user data using a confirmation process to determine whether permanent deletion of said user data should be confirmed; and
   upon confirming said deletion, permanently deleting said user data.

11. The non-transitory computer readable media of claim 10, wherein upon confirming said deletion, securely deleting said encryption and decryption keys.

12. The non-transitory computer readable media of claim 10, wherein upon not confirming said deletion, maintaining said user data decrypted and restoring said access permissions.

13. The non-transitory computer readable media of claim 12 further comprising upon restoring said access permissions, deleting said encryption and decryption keys.

14. The non-transitory computer readable media of claim 10, wherein said confirmation process comprises a hierarchical set of criteria that determines whether the user data is needed by system users or system processes.

15. The non-transitory computer readable media of claim 10, wherein said confirmation process comprises a criterion that determines whether the user data was accessed or created within a preceding predetermined period of time.

16. The non-transitory computer readable media of claim 15, wherein said confirmation process further comprises a criterion that determines whether a service or user account that created the user data has been deleted.

17. The non-transitory computer readable media of claim 16, wherein said confirmation process further comprises a criterion that determines whether the user data was machine created or human created.

18. The non-transitory computer readable media of claim 17, wherein said confirmation process further determines whether the user data is associated with either an active service account or an active user account, and, if so, keeps the user data.

* * * * *